United States Patent [19]

Murphy

[11] Patent Number: 4,736,560
[45] Date of Patent: Apr. 12, 1988

[54] PEEL RIVET

[75] Inventor: Colin R. R. Murphy, Morristown, N.J.

[73] Assignee: Engineered Construction Components (America), Panama City, Panama

[21] Appl. No.: 936,898

[22] Filed: Dec. 1, 1986

[51] Int. Cl.⁴ .................. F16B 13/04; F16B 13/08; E04B 7/00
[52] U.S. Cl. ........................ 52/410; 411/29; 411/43; 411/447; 411/450
[58] Field of Search ............... 411/29, 30, 31, 43, 411/447, 450, 458; 52/410

[56] References Cited

U.S. PATENT DOCUMENTS

| | | | |
|---|---|---|---|
| 2,959,897 | 11/1960 | Baker | 52/410 X |
| 3,143,915 | 8/1964 | Tendler | 411/29 |
| 3,750,518 | 8/1973 | Rayburn | 411/29 |
| 3,803,791 | 4/1974 | Turnbull et al. | 52/410 X |
| 3,935,786 | 2/1976 | Murray et al. | 411/29 |
| 4,074,501 | 2/1978 | Sandqvist | 52/410 X |
| 4,245,545 | 1/1981 | Freleman | 411/29 X |

FOREIGN PATENT DOCUMENTS

| | | | |
|---|---|---|---|
| 119997 | 5/1945 | Australia | 411/43 |
| 725903 | 1/1966 | Canada | 411/43 |
| 2812450 | 9/1979 | Fed. Rep. of Germany | 52/410 |
| 3346918 | 7/1985 | Fed. Rep. of Germany | 52/478 |
| 786997 | 11/1957 | United Kingdom | 411/43 |
| 1289819 | 9/1972 | United Kingdom | 411/29 |

Primary Examiner—Alfred C. Perham
Attorney, Agent, or Firm—Elliot M. Olstein; Raymond J. Lillie

[57] ABSTRACT

A rivet having a head portion and a body portion, with a bore through the head portion and body portion, said bore being capable of receiving a mandrel having a head portion with a self-piercing end portion and a cutting portion. The self-piercing end portion is capable of piercing partially or entirely through a roofing substrate. After the mandrel has pierced the substrate, the cutting portion of the mandrel peels back the rivet body into separate portions which curl back on the rivet body.

17 Claims, 2 Drawing Sheets

PEEL RIVET

This invention relates to a rivet, and more particularly to a combination of a rivet and mandrel. Still more particularly, this invention relates to a combination of a rivet and mandrel which is particularly suited for roofing.

Rivets are generally known in the art, and such rivets are generally comprised of a rivet and mandrel which are employed in combinaton with a riveting tool for securing the rivet.

In general, when employing a rivet for fastening, it is necessary to predrill a hole for inserting the combination of rivet and mandrel into both the material which is to be fastened and the substrate to which the material is to be attached. This generally required precise drilling of a hole so as to permit proper fastening.

In addition, in general, previous rivets were limited in length, with such rivets generally having a length of no greater than about two inches.

Furthermore, the strength of rivets was generally limited, whereby the rivets could not be employed for certain fastenings which require increased strength.

The present invention is directed to providing an improved combination of rivet and mandrel, as well as an improved mandrel for a rivet.

In accordance with one aspect of the present invention, there is provided a mandrel for a rivet which includes a first portion for insertion into a riveting tool, and a second opposite portion, which terminates in a self-piercing end.

In accordance with another aspect of the present invention, there is provided a mandrel for a rivet which includes means for cutting and peeling back a rivet body into separate portions which curl back on the rivet body to thereby increase the fastening strength of the rivet.

In accordance with a further aspect of the present invention, there is provided a combination of a rivet and mandrel wherein the portion of the mandrel which extends outwardly from the rivet body includes a self-piercing end.

In accordance with still another aspect of the present invention, there is provided a combination of rivet and mandrel wherein the portion of the mandrel which extends outwardly from the rivet body includes means for cutting and peeling back the rivet body in separate portions which curl back on the rivet body to increase the fastening strength thereof.

In accordance with still another aspect of the present invention, there is provided a rivet, having an increased length.

The invention will be further described with respect to the accompanying drawings, wherein:

FIG. 1 of the drawings illustrates a preferred embodiment of a combination of a rivet and mandrel in accordance with the present invention;

FIG. 2 of the drawings illustrates the combination of FIG. 1, wherein the mandrel has peeled back the rivet body;

Figure 1:
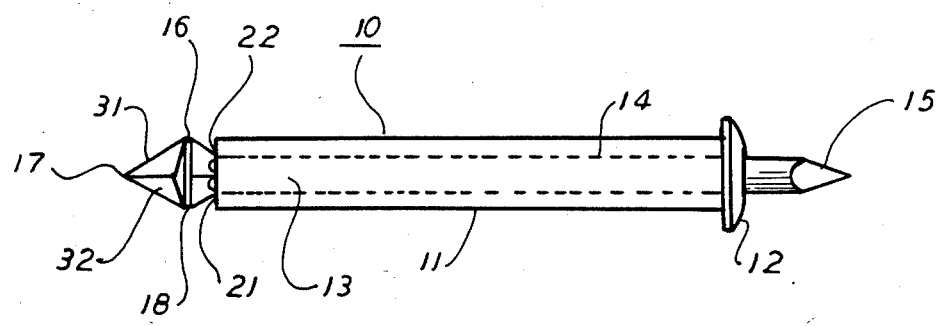

Referring now to FIG. 1 of the drawings, there is shown a rivet, generally designated as 10, which is comprised of a cylindrical main body portion 11, and a head portion 12.

The rivet 10 is provided with a central bore 13 which receives a rivet mandrel, generally indicated as 14.

The rivet mandrel has an essentially cylindrical shape, and terminates in a first end portion 15, which is adapted to be received in a riveting tool.

The end of the rivet mandrel 14 opposite to end 15 is comprised of an enlarged head portion, generally designated as 16 which is exterior to and adjacent to the end of rivet 10, which is opposite the rivet head portion 12.

Figure 3:
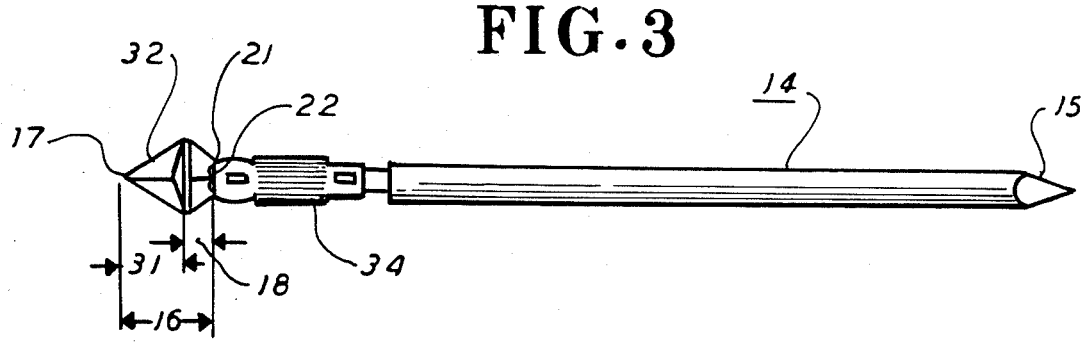
FIG. 3 is a side elevation of the rivet mandrel.
Figure 4:
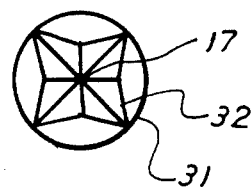
FIG. 4 is an end-view of the left end of the rivet mandrel of FIG. 3.

Referring now to FIG. 3 of the drawings, the head portion 16 of the mandrel includes a self-piercing end portion 31 which terminates in a self-piercing point 17, and further includes cutting portion 18 which functions to cut and peel back the rivet body into separate portions which curls back on the rivet body.

As particularly shown, the cutting portion 18 is comprised of cutting points 21 which are circumferentially spaced from each other, and surfaces 22, positioned between the cutting points, and which extend angularly outwardly from the main body portion of the rivet mandrel 14. Upon pulling of the mandrel 14 back through the bore 13 of the rivet 10, the cutting points 21 cut the rivet body 11 into separate sections, and the surfaces 22 cause the rivet body portion to peel and curl back onto the rivet body.

As hereinabove indicated, the head portion 16 of the rivet mandrel 14 also includes a self-piercing portion, generally designated as 31, with the self-piercing portion 31 being comprised of self-piercing point 17 and undercut surfaces 32, which extend angularly outwardly from the point 17, and which form circumferentially spaced stabilizing fins 32.

As particularly shown, the surfaces 32 slope at an angle of approximately 30 degrees with respect to the horizontal, and the surfaces 21 slope in an opposite direction, at an angle with respect to the horizontal of about 60 degrees.

Similarly, as particularly shown, there are four fins 32, which are spaced from each other by approximately 90 degrees.

The body portion 14 of the mandrel further includes a plurality of longitudinal grooves 34, adjacent to the head portion 16, which grooves 34 function to score the interior of the rivet to facilitate cutting thereof into separate sections by the cutting points 21. The longitudinal grooves 34, as well as scoring the inside of the rivet 10 act as a vibration-resistant mechanism to insure the mandrel head 16 does not come out once the rivet is in place.

Figure 2:
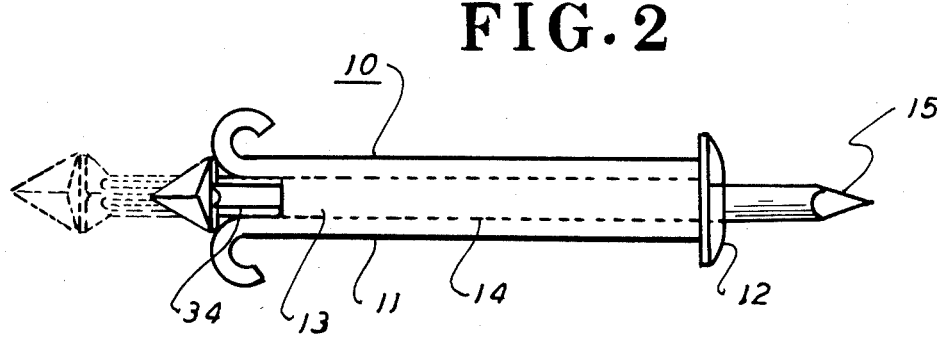

As shown in FIGS. 1 and 2 of the drawings, the mandrel is positioned in the rivet 10 with the head portion 16 thereof extending out of the main body portion 11 of the rivet 10, with the cutting points 21 of the head 16 being continguous with the surface of the rivet.

In operation, on pulling of the mandrel 14 through the bore 13 of rivet 10, the cutting points 21 cut the rivet body into separate portions, and the surfaces 22 spread the cut portions outwardly away from the mandrel 14, and cause the cut portions to curl back against the rivet body to thereby increase the strength of the rivet.

The rivet of the present invention, may be formed in lengths longer than those previously used in the art. Thus, for example, in general, rivets generally have a length which is not in excess of two inches. In accordance with the present invention, it is possible to provide rivets having lengths in excess of two inches, preferably in excess of three inches, and up to about 9½ inches, and even greater.

The rivet is particularly useful for connecting a wide variety of materials, and has particular application to fastening of roofing substrates, such as insulation and/or roof membranes to roof decks during the installation of roofs. Thus, for example, the rivet may be employed for attaching roof insulation and/or roof membranes to lightweight, metal and wood, roof decks. Lightweight decks can be Tectum, Permadeck or Martins Fireproofing cementitious wood fiber decks between 2" and 5" thick. Metal decks can be 18 gauge to 28 gauge corrugated metal decks. Wood decks can be ½" to 1" plywood or wood plank ¾" to 1" thick. Lightweight decks can also include poured or plank gypsum as well as lightweight concrete fill over a metal pan. The peel rivet will work in all of them.

In addition, the combination of rivet and mandrel in accordance with the present invention can be used even if the rivet and mandrel do not completely pierce through the materials which are to be attached to each other. Thus, in accordance with the present invention, upon drawing of the mandrel through the rivet, the rivet will peek back, and form a fastener of increased strength, even if the rivet has not completely pierced through all of the materials. For example, the rivet body will open inside a lightweight roof deck without piercing completely through the roof deck. The four sections of the rivet body will open; however, the density of the roof deck will determine how effective the tensile pull-out is.

Figure 5:
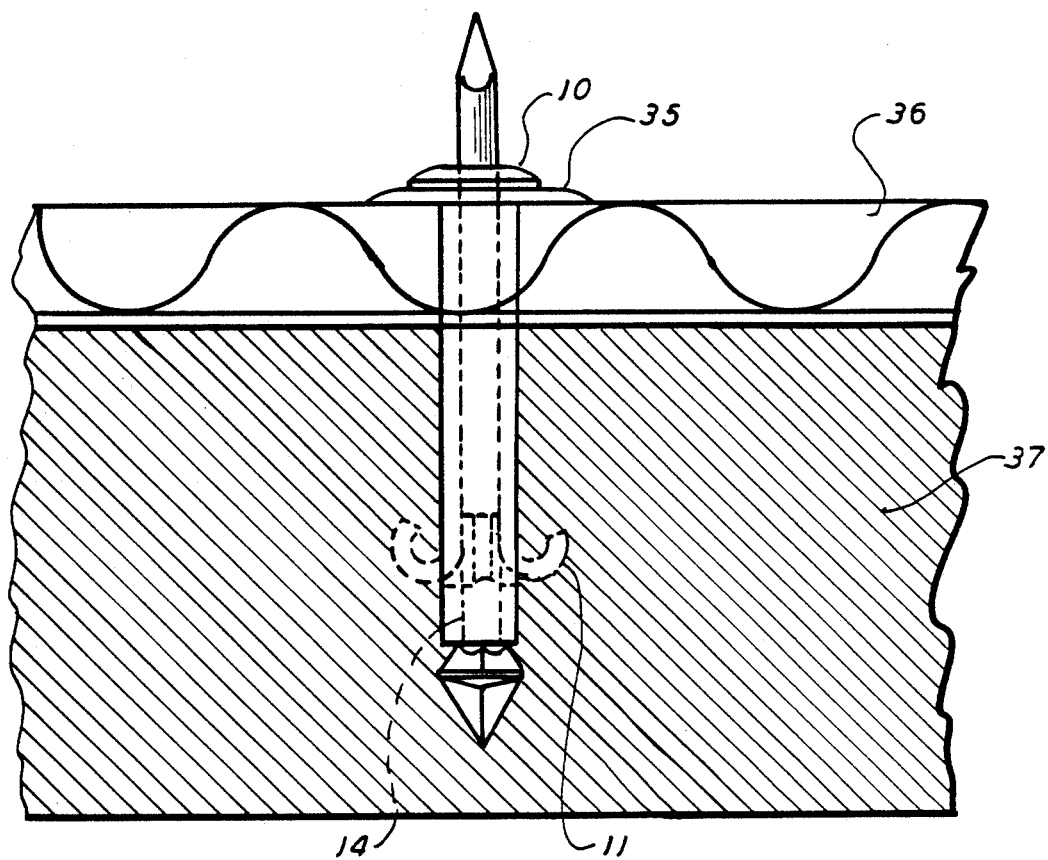
FIG. 5 is a cut-away side view of a rivet in accordance with the present invention inserted into a roof deck without piercing entirely through the roof deck.
Figure 6:
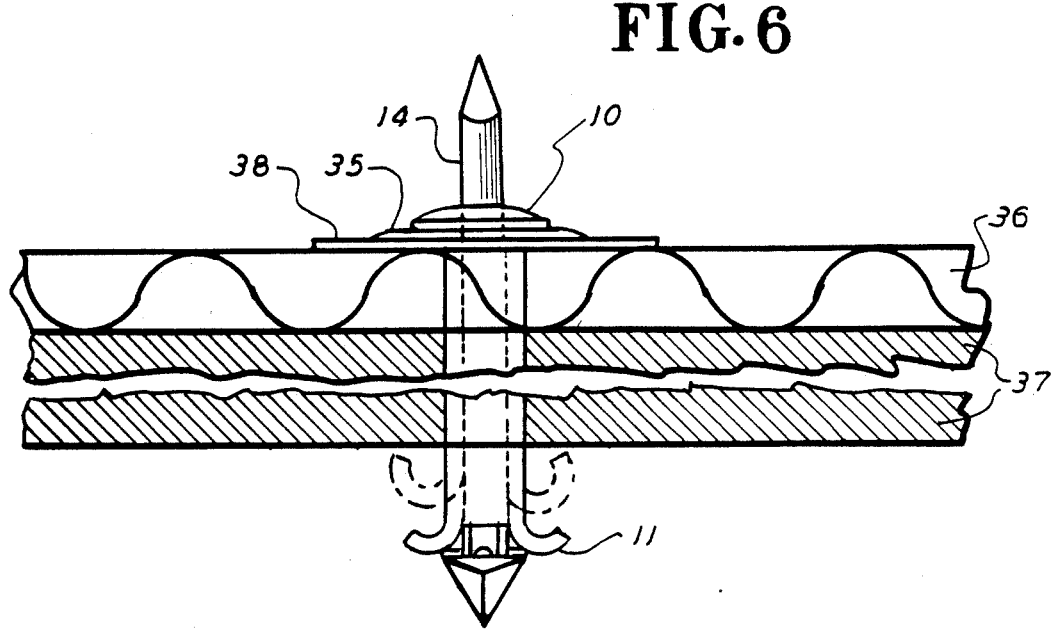
FIG. 6 is a cut-away side view of a rivet in accordance with the present invention inserted entirely through the roof deck.

FIGS. 5 shows an arrangement wherein the rivet 10 is inserted in a roof substrate overlying a roof deck 37 and into a roof deck 37 without completely piercing through the roof deck 37. Referring to FIGS. 5 and 6, the substrate comprises insulation 36 and/or a roof membrane 38. As shown in FIG. 5, the rivet 10 and mandrel 14 are inserted through a stress plate 35 which lies on top of insulation 36 and are driven through a layer of insulation 36 and into the roof deck 37. Alternatively, the roofing structure may have a roof membrane 38 overlying the insulation 36 as shown in FIG. 6. The stress plate 35 in this embodiment rests upon membrane 38. In some cases, the membrane 38 may overlie the roof deck 37 in the absence of insulation 36. Shown in phantom is the peeling back of the rivet body 11 after the rivet 10 is inserted into or through the roof deck 37.

The rivet will be installed with a special installation tool holding a stack of stress plates and rivets on a plastic banding. The rivets would automatically index into place over the stress plate. The tool will push the rivet 10 through the stress plate 35, pulling it out of the holder and therein driving the rivet 10 and mandrel 14 through the insulation 36 and deck material 37. In some cases (higher density decks), the rivet 10 may not penetrate the deck 37 totally and can open inside the deck material 37.

The mandrel 14 is contained in the bore 13 of the rivet 10. The head 16 of the mandrel extends outwardly from the bottom end of the rivet 10. The rivet 10 and mandrel 14 assembly are inserted through an opening in the stress plate 35. The self-piercing point 17 of the head 16 of the mandrel 14 pierces through the insulation 36 and/or the membrane 38 and then travels into the roof deck 37 but does not completely pierce through the roof deck 37. Thus, the mandrel 14 of which is connected in the bore 13 of the rivet 10 has inserted the rivet 10 into the roof deck 37. The head 12 of the rivet 10 rests on top of the stress plate 35.

Once in place, the mandrel 14 is pulled to peel the rivet back. The cutting points 21 of cutting portion 18 of the mandrel begin to cut the body 11 of the rivet 10 and peel back the rivet into the portions which curl back on the rivet body 11. This peeling process is done inside the roof deck 37. Once enough resistance has been put on the mandrel, it will break at the designated break point. The top of the mandrel will be pulled by air pressure into a holding chamber. The rivet 10 and mandrel 14 thus serve as a fastener for fastening a substrate to a roof deck 37.

FIG. 6 is a drawing wherein the rivet 10 and mandrel 14 have been inserted into the roof substrate and the rivet 10 and mandrel 14 have completely pierced through the roofing substrate. The insertion process is the same as described above except that the self-piercing portion 17 and head 16 of the mandrel 14, and the rivet 10 have pierced entirely through the roof deck 37. The cutting points 21 of the cutting portion 18 of the mandrel 14 then peel back the body 11 of the rivet 10 into portions that curl back upon the rivet body 11 as well as abut upon the undersurface of the roof deck 37.

These and other advantages of the present invention should be apparent to those skilled in the art from the teachings herein.

Numerous modifications and variations of the present invention are possible in light of the above teachings and, therefore, within the scope of the appended claims, the invention may be practiced otherwise than as particularly described.

What is claimed is:

1. A product comprising:
   a rivet mandrel, said rivet mandrel including a first portion for insertion into a riveting tool and a second opposite end portion terminating in a self-piercing point, said second opposite end portion including an enlarged head, said head including at one end thereof said self-piercing point, and at the opposite end thereof means for cutting and peeling back a rivet into separate portions which curl back on the rivet body.

2. The product of claim 1 wherein said one end of said head includes a tapered section terminating in said self-piercing point.

3. The product of claim 2 wherein said tapered section includes means for preventing rotation and bending of said mandrel upon piercing of a substrate.

4. The product of claim 3 wherein said means for preventing rotation and bending of said mandrel upon piercing of a substrate comprise circumferentially spaced stabilizing fins extending angularly outwardly from said self-piercing point.

5. The product of claim 1 wherein said means for cutting and peeling back a rivet into separate portions which curl back on the rivet body comprise:
   at least two cutting points for cutting said rivet body into separate sections; and
   a plurality of surfaces for causing the rivet body portion to peel and curl back onto the rivet body.

6. A product comprising:

a rivet comprised of a body portion and a head portion;

a mandrel extending through said rivet, said mandrel having a first end portion for insertion into a riveting tool and a second end portion which extends outwardly from the body portion of said rivet, said second end portion including a self-piercing end and means for cutting and peeling back the rivet body into separate portions which curl back on the rivet body.

7. The product of claim 6 wherein said rivet has a length in excess of 2 inches.

8. The product of claim 7 wherein said rivet has a length in excess of three inches.

9. The product of claim 8 wherein said rivet has a length of at least three inches and up to about 9½ inches.

10. A roofing structure comprising:

a roof deck;

a roofing substrate overlying said roof deck; and a fastener for fastening said substrate to said roof deck, said fastener comprising:

a rivet comprised of a body portion and a head portion, said body portion being in said substrate and said roof deck; and a mandrel extending through said rivet, said mandrel having a head portion including at one end thereof a self-piercing point, and at the opposite end thereof means for cutting and peeling back said rivet into portions which curl back on the rivet body, said rivet having been cut and peeled back by said mandrel head portion after insertion into said substrate and said roof deck without completely piercing through said roof deck, said rivet being cut and peeled back into portions which curl back upon said rivet body within said roof deck.

11. The roofing structure of claim 10 wherein said substrate overlying said roof deck comprises a layer of insulation.

12. The roofing structure of claim 11 wherein a roofing membrane overlies said insulation as part of said substrate.

13. The roofing structure of claim 10 wherein said substrate overlying said roof deck comprises a roofing membrane.

14. A roofing structure comprising:

a roof deck;

a roofing substrate overlying said roof deck; and a fastener for fastening said substrate to said roof deck, said fastener comprising:

a rivet comprised of a body portion and a head portion, said body portion being in said substrate and said roof deck; and a mandrel extending through said rivet, said mandrel having a head portion including at one end thereof a self piercing point, and at the opposite end thereof means for cutting and peeling back said rivet into portions which curl back upon said rivet body, said rivet having been cut and peeled back by said mandrel head portion after said rivet and the head of said mandrel have been inserted into and have pierced completely through said roof deck, said rivet being cut and peeled back into portions which curl back upon said rivet body and abut upon the undersurface of said roof deck.

15. The roofing structure of claim 14 wherein said substrate overlying said roof deck comprises a layer of insulation.

16. The roofing structure of claim 15 wherein a roofing membrane overlies said insulation as a part of said substrate.

17. The roofing structure of claim 14 wherein said substrate overlying said roof deck comprises a roofing membrane.

* * * * *